Figure 1:
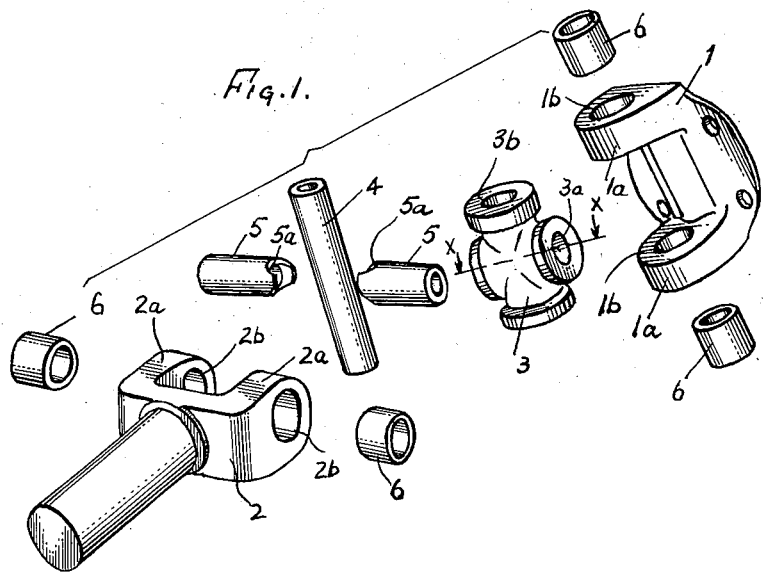

Sept. 17, 1963   S. P. V. PIATTI   3,103,798
UNIVERSAL JOINTS

Filed July 11, 1961   2 Sheets-Sheet 2

Inventor
S. P. V. Piatti
By
Attorneys

United States Patent Office 3,103,798
Patented Sept. 17, 1963

3,103,798
UNIVERSAL JOINTS
Sanzio Pio Vincenzo Piatti, 14 Corso Porta Nuova, Milan, Italy
Filed July 11, 1961, Ser. No. 123,252
Claims priority, application Great Britain July 11, 1960
3 Claims. (Cl. 64—17)

The present invention relates to universal joints which couple together rotatable input and output members in such a manner that the axes of rotation of the two members may be inclined relative to each other whilst the input and output members are in driving connection.

More particularly the invention relates to universal joints in which the adjacent ends of the input and output members are each provided with a fork, the two forks being coupled together by a coupling element in the form of a cross. The two limbs of the cross are at right angles to each other, and one limb is connected for rocking movement to the fork of the input member whilst the other limb is connected for rocking movement to the output member.

In one such form of universal joint in common use the coupling element takes the form of a forging, the ends of the limbs being machined to form stub shafts about which the forks of the input and output members rock. Coupling elements of this type have the disadvantage that they are complicated and costly to produce since the stub shafts are integral with the forging of the coupling element and each stub shaft has to be separately machined or ground. The stub shafts are generally mounted in needle bearings in aligned apertures in each fork and, to enable the coupling element to be fitted between the forks with the stub shafts in the aligned apertures therein, it is necessary for the inwardly facing surfaces of each fork to be inclined to the axis of the apertures and spaced apart by a considerably greater distance than the distance between the inner ends of two opposing stub shafts. Consequently, the needle bearings, when fitted in the apertures, project inwardly out of the forks. It is therefore necessary to provide the needle bearings with cages or cups strong enough to be self-supporting where they project from the forks. Due to the spacing between the forks it is impracticable to provide bearing surfaces between the inwardly facing surfaces of the forks and the central part of the coupling element to resist lateral thrust, and such thrust is usually taken up by the end caps of the bearing cage which are engaged by the outer ends of the stub shafts. Such an arrangement necessitates strengthening the end caps of the bearing cages.

The present invention provides an improved construction of universal joint which avoids the above disadvantages.

According to the present invention the coupling element comprises a body portion provided with two intercommunicating bores extending therethrough with the axes thereof disposed at right angles to one another, into which pins, about which the input and output members rock, are inserted, at least some of said pins being expanded within their associated bores to secure them in place.

According to a feature of the invention at least one of the fork members of the joint is folded up from sheet metal and has two aligned bearing bushes for the coupling member secured, respectively, in apertures in each of the arms of the fork member. Preferably both fork members are so constructed. The coupling member comprises a body portion in the form of a rectangular block provided with two intercommunicating bores extending therethrough, with their axes disposed at right angles to one another, from opposed flat faces of the block, and into which pins, forming the limbs of the coupling member are inserted, at least some of said pins being expanded within their associated bores to secure them in place.

The body portion may simply be cut from a length of metal bar of rectangular cross section and the intercommunicating bores may be drilled before or after cutting.

The input or output shaft may be attached to the fork member in any suitable manner, but advantageously, the sheet metal is so folded as to form a fork member having parallel arms extending from either side of a substantially flat end portion whereby the end portion provides an abutting surface against which an end flange on the input or output shaft may be bolted.

Conveniently the apertures for the bushes, bolt holes, and the like are formed in the sheet metal before folding thereof. The bearing bushes may be brazed, for example induction brazed, in the apertures. After securing in position the bushes may be reamed to ensure alignment thereof.

Figure 2:
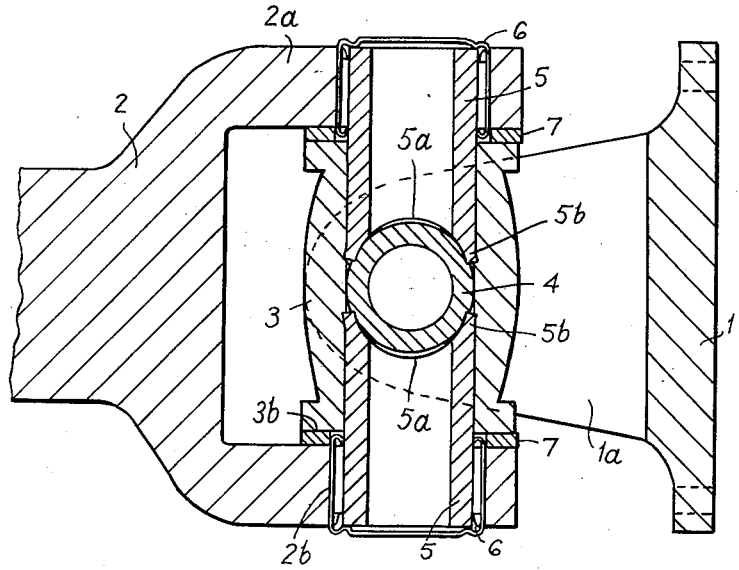
Figure 3:
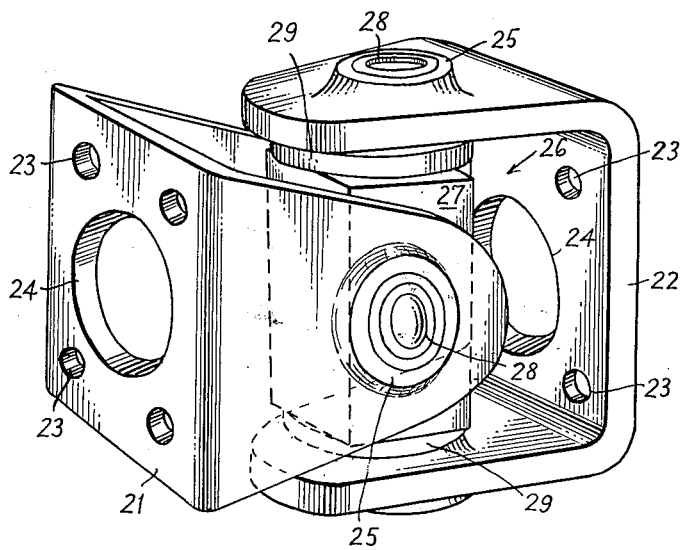

In order that the invention may be more readily understood, reference will now be made to the accompanying drawings in which:

FIGURE 1 is an exploded perspective view of a universal joint according to one embodiment of the invention, FIGURE 2 is a horizontal section along the line X—X of FIGURE 1 with the joint assembled, and FIGURE 3 is a perspective view of a universal joint of which the fork members are constructed from sheet metal.

Referring to FIGURES 1 and 2, the universal joint comprises input and output members 1 and 2 respectively, formed with forks 1a, 2a having aligned apertures 1b, 2b therein. The coupling element includes a body portion 3, formed with two bores 3a, the axes of which are at right angles and intersect each other. The outer ends 3b of the bores are machined or ground flat to form bearing surfaces.

The coupling element also includes one single pin 4 and two half-pins 5, which are a drive or force fit in the bores 3a. The inner ends 5a of the half-pins 5 are recessed about an axis perpendicular to the longitudinal axis of the half-pins to a radius which is slightly less than the radius of the single pin 4.

To assemble the joint the body portion 3 is placed between the fork of one of the input or output members with one of the bores 3a therein in line with the apertures 1b or 2b in the fork, and the single pin 4 is then passed through one aperture in one limb of the fork and pressed through the bore 3a until it projects an equal distance on each side of the body portion 3. The apertures 2b or 1b in the fork of the other of the input or output members are then aligned with the other bore 3a in the body portion 3, and the two half-pins 5 are then pressed into the bore from opposite sides of the single pin 4, with the axes of the recessed ends 5a substantially parallel to the axis of the single pin 4 until the ends 5a engage the side of the single pin 4. Since the radius of the single pin 4 is greater than the radius of the ends 5a of the half-pins 5, when the half-pins 5 are pressed against the side of the single pin 4, the edges 5b of the former are distorted by the single pin 4 as shown in FIGURE 2 and engage and bite into the sides of the bore 3a and also engage the single pin 4. Thus the two half-pins 5 are securely anchored in place. The single pin 4 is symmetrical relative to the axes of rotation of the input and output members and is not subject to any substantial centrifugal force which would tend to throw the pin out of the body portion 3, and the drive fit of the pin 4 within its bore 3a is sufficient to retain the pin 4 in place. However, the distortions of the single pin 4 by the ends of the half-pins 5 additionally secure the single pin 4 in its bore 3a.

When the three pins have been thus assembled, needle bearings 6, for example of the type manufactured by the Torrington Company Limited of Coventry, England, are pressed into and secured in the apertures 1b, 2b in the forks, around the outer ends of the pins.

With the universal joint according to the present invention, since the body portion 3 is placed in position between the limbs of the forks of the input and output members before the pins 4 or 5 are inserted, the inner faces of the forks can be perpendicular to the axis of the apertures therein and can be spaced closer together than in prior constructions, and can, therefore, completely surround and support the needle bearings, thereby permitting cheaper needle bearings having less robust cages or caps to be used. Moreover, the inwardly facing surfaces of the forks form bearings surfaces to absorb lateral thrust from the machined surfaces 3b of the body portion 3.

If desired thrust washers 7, for example nylon washers, may be disposed between the inwardly facing surfaces of the forks of the input and output members and the machined outer surfaces 3b of the body portion 3. The accommodation of lateral thrust in this way alleviates the necessity of reinforcing the end caps of the bearing cages.

Referring to FIGURE 3 of the drawing, the universal joint comprises two fork members 21, 22 pressed or folded up from sheet metal, for example sheet steel, so as each to have parallel arms extending from each side of a flat end portion. Before pressing, the sheet metal is formed with bolt holes 23, a locating aperture 24, and an aperture in each arm in which is secured a bearing bush 25. The bearing bushes may be induction brazed in the arm apertures.

The coupling member 26 coupling the two fork members 21, 22 comprises a body portion 27 in the form of a rectangular block drilled with two intercommunicating bores extending therethrough at right angles to one another from opposed flat faces thereon. The body portion 27 may be cut from a metal bar of rectangular cross section. The body portion and the pins forming the limbs about which the fork members 21, 22 are mounted for rocking movement may be assembled with the fork members in the way hereinbefore described. The ends of the pins located within the bearing bushes 25 are mounted in needle bearings 28, such as of the type manufactured by The Torrington Company Limited. Thrust washers 29, for example nylon washers, may be disposed between the inwardly facing ends of the bearing bushes and the flat surfaces of the body portion 27. The bearings 28 may have end caps, if desired.

The universal joint may be secured between input and output shafts (not shown) by providing these with end flanges which are bolted into abutting engagement with the surface of the flat portions of the fork members by bolts passed through the flanges and bolt holes 23. Alternatively the ends of the shafts may simply be welded or brazed into the locating apertures 24.

In a modification, the bearing bushes are formed from sintered powdered metal and are impregnated with lubricating oil. The bushes are then brazed in position with the body portion located between the arms of the particular fork member so that the ends of the bushes abut the adjacent flat faces of the body portion. This does away with the necessity of providing a thrust washer, and the abutting surfaces of the body portion and bushes are continually lubricated.

In one particular example of the joint shown in FIGURE 3, the fork members of the joint are pressed from 0.165" thick sheet steel with the bearing bushes brazed into apertures in the pressings by an induction process. Such a joint is able to transmit 40 H.P.

While particular embodiments have been described, it will be understood that various modifications may be made without departing from the scope of the invention. For example, the inner ends of the half-pins 5 in the embodiment of FIGURES 1 and 2 may, instead of being recessed on a radius may have a V-shaped or truncated V-shaped recess.

I claim:

1. A universal joint comprising input and output forks coupled together by a coupling element in the form of a cross, wherein each of the arms of the forks has aligned apertures therein, and each of said apertures has therein a bearing comprising a plurality of rollers assembled in a cage, and wherein the coupling element comprises a body portion provided with two intercommunicating bores extending therethrough with their axes intersecting at right angles, said bores each being of uniform diameter throughout its length, a cylindrical pin of uniform diameter throughout its length forced into one bore with its opposite ends projecting from opposite sides of the body portion and located within the bearings of one fork, and two cylindrical half-pins forced into opposite ends of the other bore with their outer ends projecting from other opposite sides of the body portion and located within the bearings of the other fork, the inner ends of said half-pins being shaped to form horns at diametrically opposite sides of said inner ends of the half-pins, said half-pins being forced into the body portion with said horns so wedged between the surfaces of the pin and the surrounding bore as to bite into the surface of said surrounding bore, thrusts in the direction of the axes of the pins and half-pins being absorbed between the opposite surfaces of the body portion and the arms of the forks.

2. A joint as claimed in claim 1, wherein thrust washers are interposed between the faces of the body portions from which the ends of the pins and half-pins project and the opposing surfaces of the arms of the forks.

3. A universal joint as claimed in claim 1 wherein each of the forks is folded up from sheet metal with substantially parallel arms, each of the arms of each fork having aligned apertures therein, and each of said apertures having a bearing bush secured therein so that the bush projects beyond the inner and outer surfaces of the arm in which it is secured.

References Cited in the file of this patent
UNITED STATES PATENTS

| | | |
|---|---|---|
| 1,371,750 | Fox | Mar. 15, 1921 |
| 2,067,283 | Padgett | Jan. 12, 1937 |
| 2,141,264 | Cutting | Dec. 27, 1938 |
| 2,597,240 | Greiner | May 20, 1952 |
| 2,819,596 | Stillwagon | Jan. 14, 1958 |
| 2,844,949 | Stillwagon | July 29, 1958 |
| 3,016,501 | Gardner | Jan. 9, 1962 |